INVENTOR.
NILS B. MICKELSON
ATTORNEYS

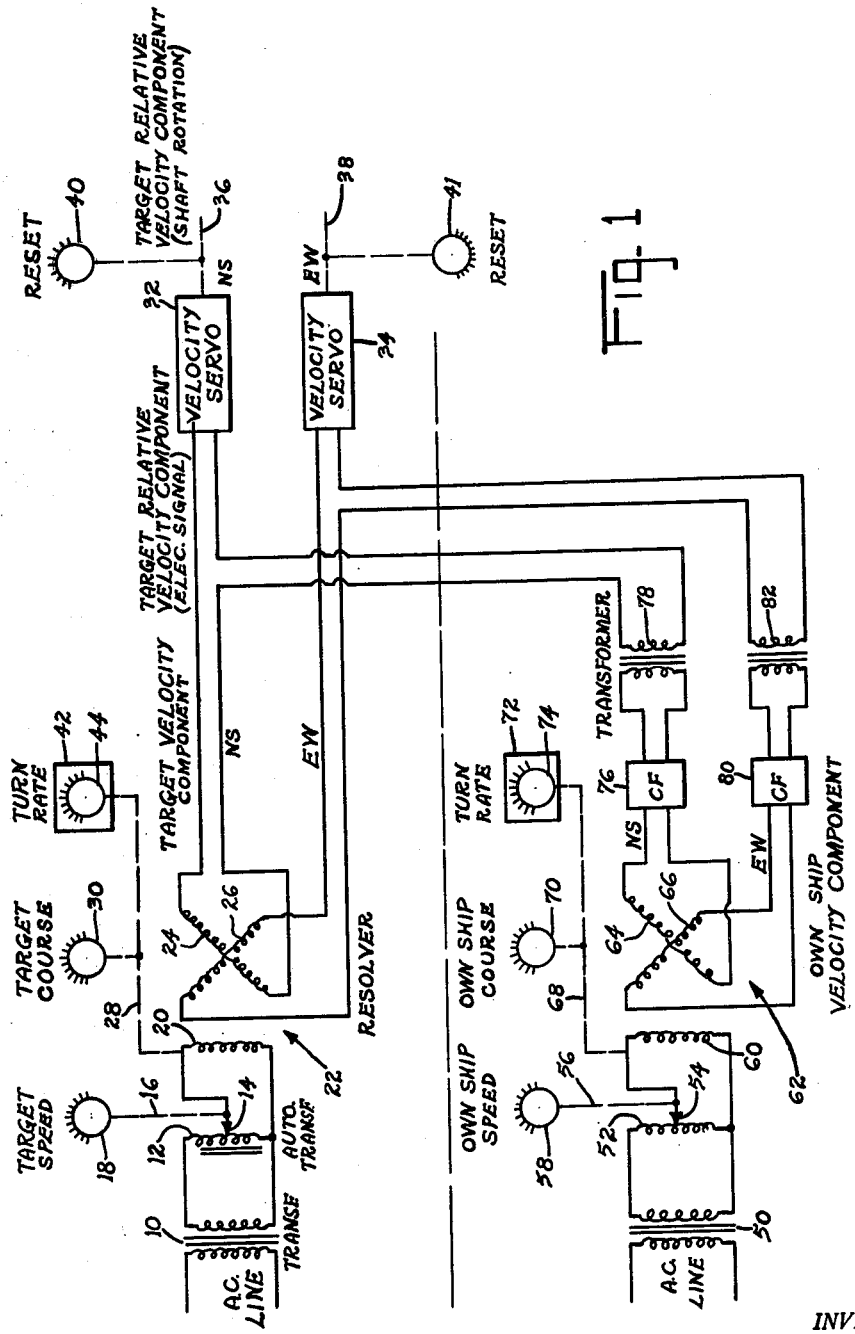

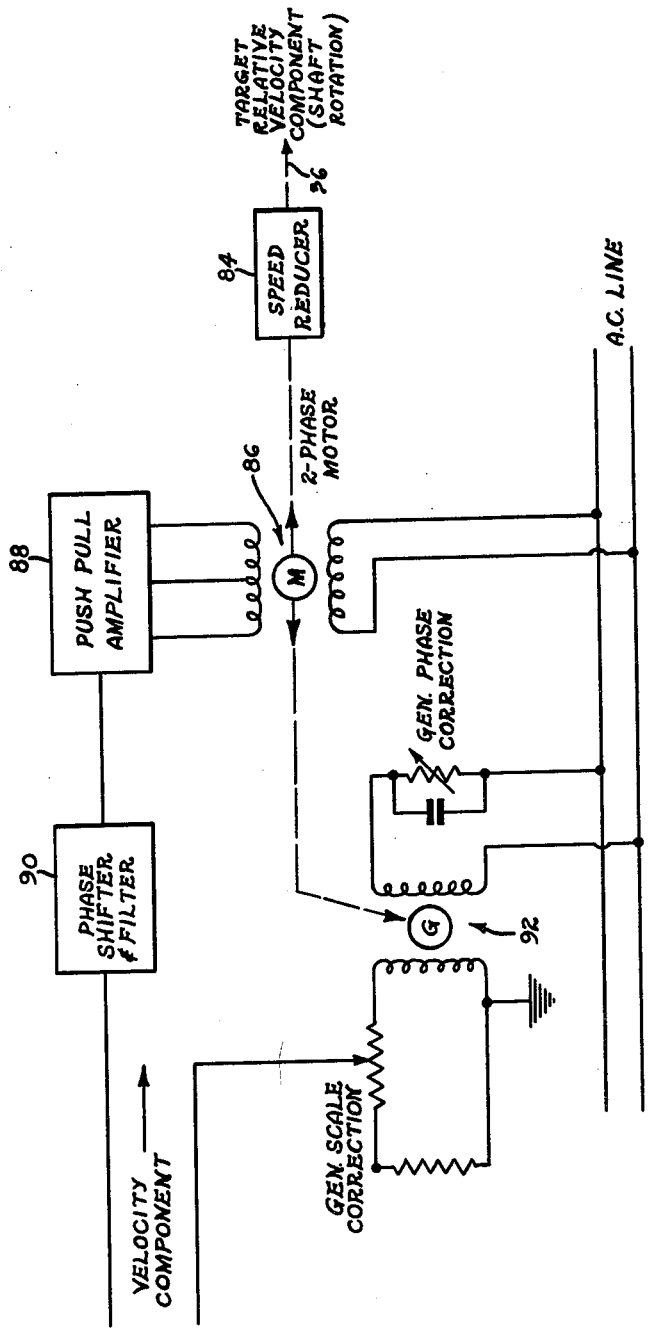

United States Patent Office 3,113,170
Patented Dec. 3, 1963

3,113,170
ANALOG COMPUTING DEVICE
Nils B. Mickelson, Stamford, Conn., assignor, by mesne assignments, to the United States of America as represented by the Secretary of the Navy
Filed Oct. 7, 1957, Ser. No. 688,786
1 Claim. (Cl. 35—10.4)

This invention relates to an analog computing device and especially to a synthetic moving target course generator.

Target course generators are employed in conjunction with radar devices to train radar operators, fighter direction and control personnel, etc., in the surveillance of moving radar targets and in the proper operation of the radar devices. The target course generator produces mechanical shaft rotations and/or voltages which are applied to the conjunctively utilized radar devices which convert the shaft rotations or the voltages into synthetic target presentations.

Previous target course generators have generally been of the type in which mechanical rotations rather than electrical signals are utilized mediately for the production of ultimate shaft rotations which furnish the final positional data. This type of target course generator requires prime movers, differential means, synchro transmitting links, mechanical couplings and other mechanical devices in the production of the final data. It is desirable from the standpoint of simplicity, economy, size and weight of equipment to reduce the number of such mechanical components employed in a target course generator.

The objects and advantages of the present invention are accomplished by converting the angular displacements of a plurality of independent input shafts into a pair of rectangular component voltages and utilizing these voltages to control the speed and direction of rotation of a pair of output shafts.

A typical embodiment of the invention comprises a moving radar target course generator in which one input shaft, corresponding to target speed, controls the moving arm of an auto-transformer and another input shaft, corresponding to target course, controls the position of the rotor of a rotary transformer used as a resolver. The resolver input is the output of the auto-transformer. Each of the component outputs of the resolver feeds into a different velocity servo, the outputs of the servos being shaft rotations corresponding to North-South and East-West components of target course and speed. The speeds of rotation of the output shafts are a function of the angular displacements of both the target speed input shaft and the target course input shaft.

To convert the typical embodiment to a relative motion device, rectangular component voltages, corresponding to own-ship speed and course information and derived from another autotransformer and rotary transformer, are fed respectively to the proper velocity servos for combination with the corresponding target rectangular component voltages. The output shaft rotations are then in terms of target ship speed and course relative to own-ship position.

A primary object of this invention is to electrically convert the angular displacements of a pair of independent input shafts into rectangular component rotational movements of a pair of output shafts, the speed of rotation of the output shafts being a function of the angular displacement of the input shafts.

Another object is to provide a target course generator in which the output information is electrically derived from the input information.

Yet another object is to provide a target course generator in which the output information is electrically derived from the input information and is relative to the position of own-ship, or to wind or current motions.

A further object is to provide a relatively light-weight, simple and inexpensive target course generator.

Other objects and many of the attendant advantages of this invention will be readily appreciated as the same becomes better understood by reference to the following detailed description when considered in connection with the accompanying drawings wherein:

FIG. 1 is a schematic diagram of a preferred embodiment of the invention,

FIG. 2 is a schematic diagram of a velocity servo which may be employed in this invention.

Figure 3A:
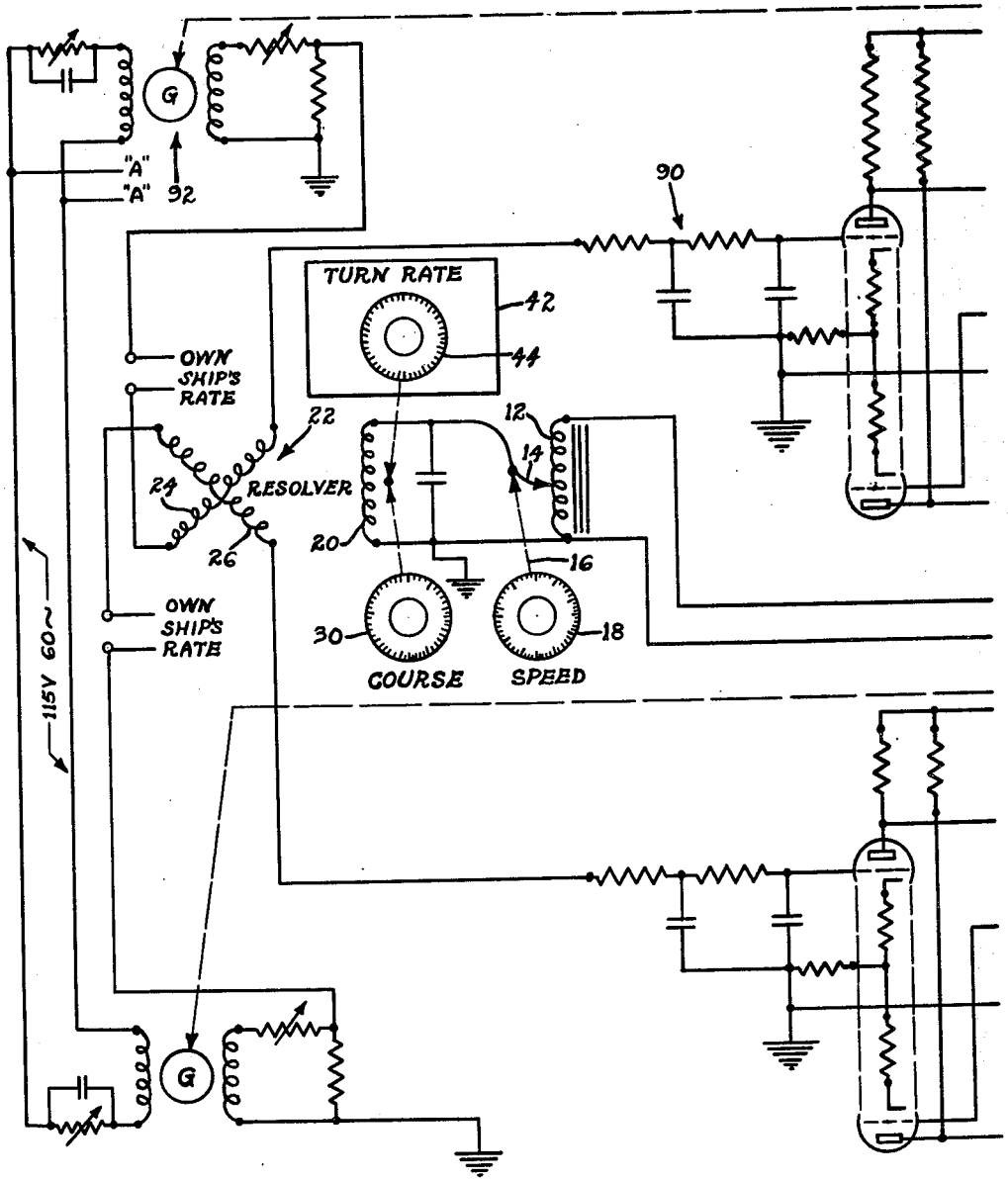
FIGS. 3a and 3b are schematic circuit diagrams of the preferred embodiment of the invention.

In FIG. 1, a transformer 10 isolates the device from the line voltage and provides an A.C. voltage for an autotransformer 12. The moving arm 14 of the autotransformer 12 is coupled through a shaft 16 to a dial knob 18, preferably manually controlled. The dial knob 18 may be calibrated in terms of the speed of a target and the magnitude of the output voltage of the autotransformer 12 will then represent the rate at which the target is moving.

The autotransformer output voltage is applied to the rotor winding 20 of a rotary transformer 22 which has a pair of quadrature-wound stator windings 24 and 26. The rotor 29 of the rotary transformer or resolver 22 is coupled through a shaft 28 to a dial knob 30, preferably manually controlled. This dial knob 30 may be calibrated in terms of the compass course of the target and the resolver 22 therefore provides a pair of voltages which are quadrature (rectangular) components of the input voltage applied to the rotor 20. The relative magnitudes and polarities of the quadrature voltages are determined by the angular position of the rotor 20. (Hereinafter the term "quadrature voltages" or "quadrature signals" will be understood to refer to the rectangular component voltages into which the input to the rotary transformer 22 is resolved.)

The quadrature output voltages of the stator coils 24 and 26 are applied to velocity servos 32 and 34 respectively. Velocity servos are well-known in the servo art and are simply devices which convert an input voltage into an output shaft rotation the speed of which is proportional to the magnitude of the input voltage and the direction of which corresponds to the polarity of the input voltage.

The rates at which these voltages vary correspond to the target speed components along the North-South and East-West axes.

Reset knobs 40 and 41 are coupled to the output shafts 36 and 38, respectively, to enable the shafts to be manually rotated to any desired positions at any time.

A turn rate mechanism 42 may be provided to permit automatic rotation of the target course shaft 28 at any one of various preselectable speeds. The turn rate mechanism 42 may, for example, comprise a conventional ball and disk integrator which is rotated by means of a motor. Typical turn rates may be from 0 to 10 degrees per second left or from 0 to 10 degrees per second right and the rate of turn may be selected by setting a dial knob 44 which controls the position of the ball in the ball and disc integrator. The turn may be initiated and halted by means of a toggle switch control for starting and stopping the motor.

If a relative motion target course generator is desired, a second velocity components generator for introducing a second set of speed and course values is employed. The relative motion may be with respect to wind, current, own-ship movements, etc. In the embodiment shown, the relative motion is with respect to own-ship. The own-ship velocity component generator utilizes another line transformer 50, autotransformer 54, resolver 62 and associated controls which operate as explained above in the case of the corresponding elements in the target velocity components generator.

Each of the quadrature voltage outputs of the resolver 62 is applied through a cathode follower stage and an isolation transformer to the velocity servo to which the corresponding target velocity component voltage is being applied. To illustrate the output of own-ship course-resolver stator coil 64 is applied through cathode follower stage 76 and isolation transformer 78 to the same velocity servo 32 as the output of target-ship course-resolver stator coil 24.

The cathode follower stages 76 and 80 are employed as impedance-lowering devices since the output impedance of the stator coils is high.

The own-ship velocity components are combined in series with the target ship velocity components to produce target relative velocity components (i.e., rectangular components of target velocity relative to own-ship).

FIG. 2 shows a velocity servo, e.g. 32, in somewhat greater detail. Since velocity servos are well-known in the servo art, no attempt to explain the overall operation is necessary at this point. The speed reducer 84 may be a stepdown gearing arrangement providing a desirable gear reduction ratio for the multiturn potentiometer (not shown) the contact arm of which may be rotated by the velocity servo output shaft 36.

The two-phase motor 86 and its counterpart in the other velocity servo 34 have a common reference phase since one field winding in each is supplied from the A.C. line. The component velocity signals applied to the other windings of the motors therefore establish the desired rotational relationship between the output shafts (or rotating parts) of the motors.

If desired, a description of velocity servos, also known as rate servos, may be obtained in vol. 4, part 10, of "Synchro and Servo Fundamentals," Navpers 91918, published in 1953 by the Bureau of Naval Personnel. Descriptions are also available in other technical books covering servomechanisms.

Figure 3B:
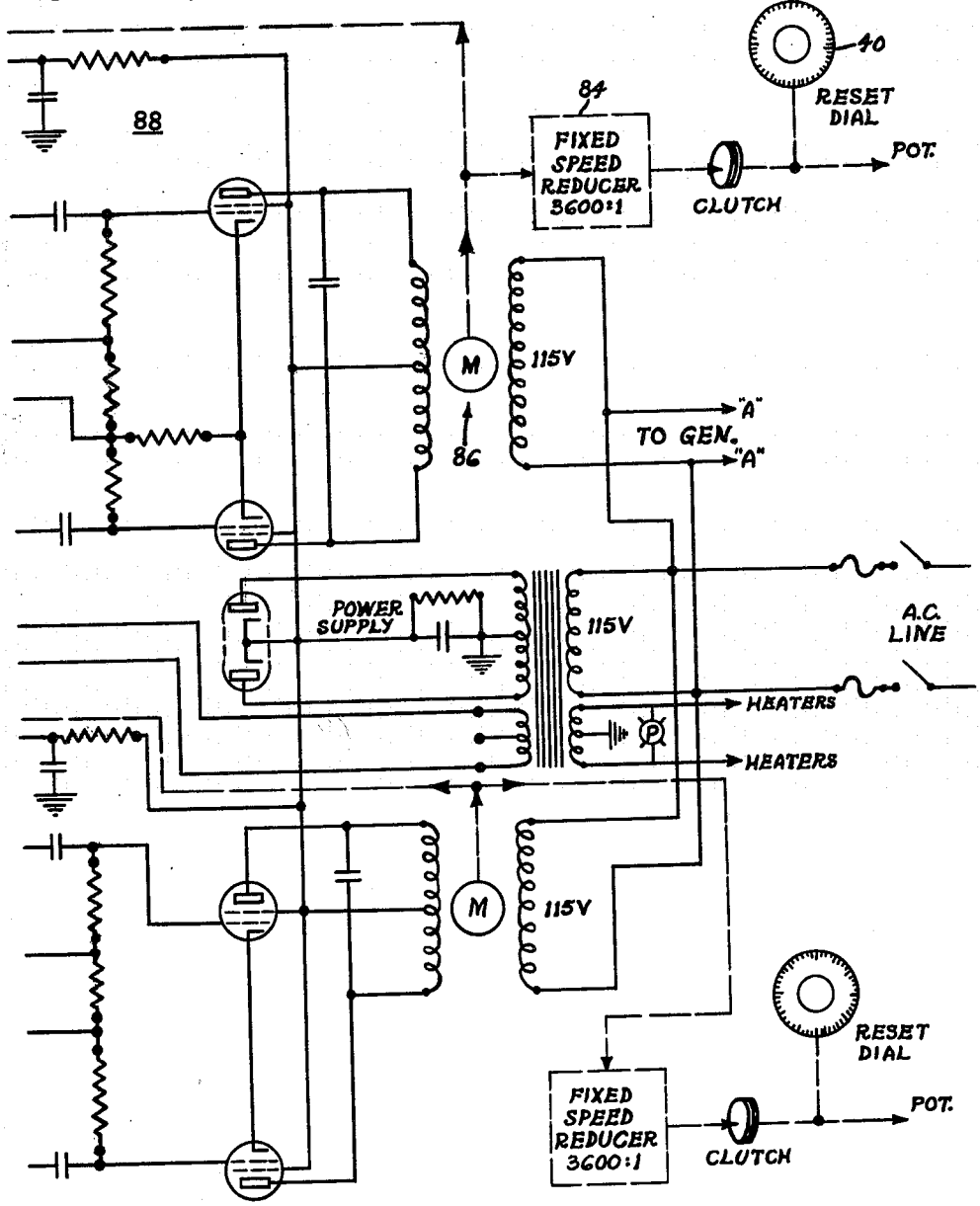

FIG. 3 provides the specific circuit details for the conventional phase shafter and filter 90 and the push-pull amplifier 88 employed in the preferred embodiment of the invention.

In operation, the target course generator is employed in conjunction with a utilization and display device, such as the "Moving Radar Targets Generator Device 15–J–1" which is described in the "Handbook of Operation and Maintenance Instructions for the Moving Radar Targets Generator, Device 15–J–1," NAVEXOS P–992, published March 1, 1952, by the Special Devices Center of the U.S. Navy, Sands Point, Long Island.

To begin a training problem, the operator sets the reset dials 40 and 41 to bring the target pip to a desired position on the display device, which may be a radar PPI scope, for example. He then manipulates the target speed and course dials 18 and 30 and the own-ship speed and course dials 58 and 70 to move the target pip along any desired course at any selected speed or speeds. He may also cause the target to execute turns at selected turn rates by properly setting the turn rate dial 44 and actuating the turn rate motor for the desired period of time. The student observes the movements of the synthetic target pip on the scope and receives training equivalent to or better than that possible under actual operational conditions.

Obviously many modifications and variations of the present invention are possible in the light of the above teachings. It is therefore to be understood that within the scope of the appended claim the invention may be practiced otherwise than as specifically described.

I claim:

A target course generator for producing shaft rotations that may be used to produce synthetic moving target presentations on radar display devices including: a variable voltage means whose output is representative of the rate of speed of a moving target; a resolving means dividing the output of the variable voltage means into two quadrant component voltages, each a function of the target's course along one of the two axes of a rectangular coordinate reference system; said resolving means including a rotor positioning means calibrated in terms of target course for setting a course for a simulated target and a calibrated rotating means, coupled to said resolving means, for continuously turning the rotor of said resolving means, at a particular rate, thereby changing the course of the target at said particular selected rate of change, said resolving means being coupled to said variable voltage means; and two servo means, each of whose shaft rotates at a speed which is proportional to one of the two quadrant component voltages, operatively coupled to said resolving means, whereby each of the shaft rotations are each proportional to the speed of a simulated vehicle along one of the two axes of a rectangular coordinate system may be produced, each of said servo motor means including a filter and a push pull amplifier between said motor means and said resolving means.

References Cited in the file of this patent

UNITED STATES PATENTS

| 2,525,124 | Gallaway et al. | Oct. 10, 1950 |
| 2,536,495 | Ewing | Jan. 2, 1951 |
| 2,553,529 | Dehmel | May 15, 1951 |
| 2,560,527 | Dehmel | July 10, 1951 |

OTHER REFERENCES

"Analog Methods in Computation and Simulation" (Soroka), published by McGraw-Hill Book Co., Inc. (New York), 1954 (page 7 relied on).

Control Engineering, vol. 2, No. 3, March 1955, "Basic Math with AC Analogs," by Davidson, pages 57–59, FIGS. 1 and 3, relied on.